United States Patent [19]

Mignani et al.

[11] Patent Number: 5,118,774

[45] Date of Patent: Jun. 2, 1992

[54] BORON/NITROGEN PRECERAMIC POLYMERS AND BORON NITRIDE CERAMIC MATERIALS PRODUCED THEREFROM

[75] Inventors: Gerard Mignani, Lyons; Jean-Jacques Lebrun, Caluire, both of France

[73] Assignee: Rhone-Poulenc Chimie, Courbevoie, France

[21] Appl. No.: 643,692

[22] Filed: Jan. 22, 1991

Related U.S. Application Data

[63] Continuation of Ser. No. 242,977, Sep. 12, 1988, abandoned.

[30] Foreign Application Priority Data

Sep. 11, 1987 [FR] France ................. 87 12586

[51] Int. Cl.⁵ .............................. C08G 79/08
[52] U.S. Cl. ............................ 528/7; 528/5; 556/402; 556/403
[58] Field of Search ............ 528/5, 7; 556/402, 403

[56] References Cited

U.S. PATENT DOCUMENTS 4,581,468  4/1986  Paciorek et al. ............... 556/403
4,707,556  11/1987  Paciorek et al. ............... 556/403
4,939,222  7/1990  Mignani et al. ............... 528/5
5,068,154  11/1991  Mignani et al. ............... 528/5

FOREIGN PATENT DOCUMENTS 2163761  3/1986  United Kingdom .

*Primary Examiner*—Melvyn I. Marquis
*Attorney, Agent, or Firm*—Burns, Doane, Swecker & Mathis

[57] ABSTRACT

Crosslinked random boron/nitrogen preceramic polymers are prepared by reacting (a) admixture of a trihalogenoborane A and a cyclic boron/nitrogen compound B containing recurring structural units of the following general formula (1):

$$-\underset{\underset{\text{N}}{|}}{\overset{\overset{\text{R}}{|}}{\text{N}}} - \underset{\underset{\text{B}}{|}}{\overset{\overset{\text{A}}{|}}{\text{B}}} - \qquad (1)$$

in which A is a halogen atom and R is a hydrogen atom, or a hydrocarbyl, organosilyl or hydrogenoorganosilyl radical, with (b) an amino compound C containing at least one —NH₂ group; the resulting polymers are facilely pyrolyzed into boron nitride ceramic materials.

27 Claims, No Drawings

BORON/NITROGEN PRECERAMIC POLYMERS AND BORON NITRIDE CERAMIC MATERIALS PRODUCED THEREFROM

This application is a continuation of application Ser. No. 07/242,977, filed Sep. 12, 1988, now abandoned.

CROSS-REFERENCE TO COMPANION APPLICATIONS

Our copending applications, Ser. No. 242,907 filed Sep. 12, 1988, U.S. Pat. No. 4,939,222 and Ser. No. 243,827, filed Sep. 12, 1988, U.S. Pat. No. 5,068,154 and both assigned to the assignee hereof.

BACKGROUND OF THE INVENTION

1. Field of the Invention

The present invention relates to novel polymers based on boron and nitrogen and to a process for the preparation thereof.

This invention also relates to the us of such novel polymers in the production of ceramic materials and shaped articles based on boron nitride, especially boron nitride in fibrous form.

2. Description of the Prior Art

Boron nitride is increasingly in demand in this art in light of its high thermal stability, its resistance to thermal shock, its great chemical inertness and its very good thermal conductivity. On the other hand, its low electrical conductivity makes it an insulator of choice.

Several processes are presently known to the art for the preparation of boron nitride.

One such process includes reacting boron trichloride with ammonia in the gaseous state. A fine boron nitride powder is obtained in this manner, which may be sintered to produce solid shaped articles. However, the shaped articles thus produced exhibit characteristic microporosity which may be highly detrimental for certain applications.

More recently, it was discovered that boron nitride could be produced by the pyrolysis of precursor polymers.

The advantage of this "polymer" method primarily resides in the form of the final product, and, more particularly, enables the production, after pyrolysis, of boron nitride fibers.

Thus, in U.S. Pat. No. 4,581,468 a preceramic organoboron polymer is described which is prepared by the interaction of ammonia (ammonolysis) with B-trichloro-N-tris(trialkylsilyl)borazine (a cyclic compound) and which, as indicated, after drawing and pyrolysis at 970° C., results in the production of boron nitride fibers.

However, the cyclic polymer described in this patent is very difficult to prepare and is thus expensive. Therefore, it is not suitable for production on an industrial scale.

On the other hand, the maximum yield by weight of boron nitride that can be produced from such type of starting material does not exceed 22%, indicating that actual yields are on average well below this value.

SUMMARY OF THE INVENTION

Accordingly, a major object of the present invention is the provision of a simple, efficient, economical and readily applicable improved process for the preparation of organometallic polymers based on boron and nitrogen in a wide variety of useful forms (wires, fibers, molded shaped articles, coatings, foils, films, and the like), and which various forms are facilely converted in high yields by weight, upon pyrolysis, into useful materials based on boron nitride.

Briefly, it has now surprisingly and unexpectedly been determined that boron nitride can be prepared, in high yields by weight, from precursor polymers based on boron and nitrogen, by reacting (a) a mixture containing a trihalogenoborane (compound A) and a cyclic compound (B) which comprises recurring structural units of the Formula (I):

wherein A represents a halogen atom and R is a hydrogen atom, or a hydrocarbyl, organosilyl or hydrogenoorganosilyl radical, with (b) a compound containing at least one $NH_2$ group (compound C).

DETAILED DESCRIPTION OF THE PREFERRED EMBODIMENTS OF THE INVENTION

More particularly according to the present invention, the compounds C will hereinafter be designated aminolysis reagents generally (an amine compound having at least one $NH_2$ group), and an ammonolysis reagent in the more particular case where ammonia is used.

Also, and in consequence of the above, the reaction products produced from the compounds A, B and C shall hereinafter be designated, depending on the particular case, aminolysates or ammonolysates, with the latter of course being included in the generic class of "aminolysates".

These aminolysates, as more fully explained below, constitute the novel polymers based on boron and nitrogen, which circumscribe another object of the present invention.

The preparative process according to this invention essentially comprises a co-aminolysis of a mixture of at least one trihalogenoborane and at least one cyclic compound B as defined above.

Thus, it has surprisingly and unexpectedly now been discovered that such co-aminolysis enables the production of polymers having a structure constituting a particularly cross-linked network which imparts great thermal stability during pyrolysis, thereby increasing the yield in boron nitride.

Furthermore, and this circumscribes another advantage of the process according to the invention vis-a-vis that of U.S. Pat. No. 4,581,468, the fact that mixtures based on trihalogenoborane (a compound that is easy to prepare industrially and which is therefore inexpensive) are used makes it possible to significantly reduce the amount of cyclic compounds to be employed, which renders the process of the invention particularly economical.

The starting compound A that is advantageously used is trichloroborane, although other halogenoboranes are also suitable, such as, for example, a trifluoro-, a tribromo- or a triiodoborane.

The starting cyclic compound B is advantageously also a chlorine compound.

This compound preferably has the following general formula:

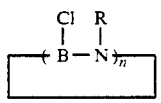

wherein the radical R, as indicated above, is a hydrogen atom or a hydrocarbyl, organosilyl or hydrogenoorganosilyl radical, and the index n represents an integer ranging from 2 to 20 and preferably from 3 to 10.

The hydrocarbyl radicals are advantageously alkyl, cycloalkyl, aryl, alkylaryl or arylalkyl radicals, as well as alkenyl or alkynyl radicals.

Representative such alkyl radicals include the methyl, ethyl, propyl, butyl, pentyl, hexyl, heptyl and octyl radicals. Representative cycloalkyl radicals include the cyclopentyl, cyclohexyl and cycloheptyl radicals. Exemplary aryl radicals are the phenyl and naphthyl radicals, and exemplary alkylaryl radicals are the tolyl and xyxyl radicals. Representative arylalkyl radicals are the benzyl and phenylethyl radicals.

Illustrative of the alkenyl radicals are the vinyl, allyl, butenyl and pentenyl radicals, and illustrative alkynyl radicals are the ethynyl, propynyl and butylyl radicals.

In a preferred embodiment of the invention, the radical R is an organosilyl radical, and more particularly a (triorgano)silyl radical. Even more preferably, a (trialkyl)silyl radical is used, such as, in particular, a trimethyl-, triethyl-, tripropyl-, tributyl-, tripentyl-, trihexyl-, triheptyl- or trioctylsilyl radical. The (trimethyl)silyl radical is especially preferred.

The cyclic compounds B are well known to this art and may be prepared by any method itself known to the art. In particular, they may be prepared by thermolysis, in xylene, at reflux in the vapor phase, of compounds corresponding to the type:

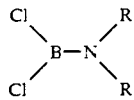

(wherein R is defined as above) and by methods such as those described in the literature (for example, in R. L. Wells, *Inorg. Chemistry,* 2 (1963), and in P. Geymayer, Montash., 97, 429 (1966)).

These latter compounds are also well known to this art.

For example, in the case of alkyl type R radicals, see Wilberg and Schuster (*Zeitschrift fur Anoroanische Chemie,* 213, page 77 (1933)), Brown (*Journal of the American Chemical Society.* 74, page 1219 (1952)), or Burg and Banus (*Journal of the American Chemical Society,* 76, page 3903 (1954)).

Concerning the radicals R of triorganosilyl type, see Jenne and Niedenzu (*Inorganic Chemistry.* 3, 68 (1964)), Sujishii and Witz (*Journal of the American Ceramic Society,* 79, page 2447 (1957)), or Wannagat (*Angew. Chemie, International Edition,* 3, page 633 (1964)).

In general, the desired compound of the formula:

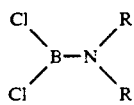

may be prepared by the action of BCl₃ on

under suitable conditions of temperature and molar ratio.

Finally, concerning the aminolysis reagents (compound C) according to the invention, ammonia, the primary amines, the diamines (hydrazine, alkylhydrazine, hydrazide, alkylenediamines, etc.), the amides, the silylamines, and the like, are exemplary.

However, preferably the compounds having the following general Formula (2) are used:

wherein the radical $R^1$ is a hydrogen atom, or a hydrocarbyl, organosilyl or hydrogenoorganosilyl radical. The following are particularly representative:

(i) ammonia ($R^1$ = hydrogen atom);

(ii) the primary organoamines ($R^1$ = alkyl, cycloalkyl, aryl, alkylaryl or arylalkyl), such as, for example, methylamine, ethylamine, propylamine butylamine, pentylamine, heptylamine and octylamine, cyclopropylamine, phenylamine, and the like;

(iii) silylamines and more particularly triorganosilylamines, such as (trimethylsilyl)amine and (triethylsilyl)amine, or the hydrogenodiorganosilylamines, such as, for example, (hydrogenodimethylsilyl)amine.

The preferred aminolysis reagents are the primary alkylamines and ammonia.

In a more preferred embodiment of the invention, ammonia is used.

The general reaction scheme of the aminolysis in the reaction medium is as follows:

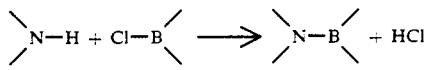

The aminolysis reaction may be carried out in mass or, preferably, in an organic solvent medium (hexane, pentane, toluene, etc.), under anhydrous conditions.

The operation is typically carried out under atmospheric pressure, although lower or higher pressures are also within the ambit of this invention.

On the other hand, the aminolysis reactions are characteristically rather exothermic and it is thus preferred to operate at a low temperature.

The duration of the reaction, as a function of the amounts of the reagents introduced, may range from a few minutes to several hours.

The molar ratio in the initial mixture between the trihalogenoborane and the cyclic compound may vary to a very large degree. In general, it is observed that the higher the percentage of the trihalogenoborane in the mixture, the higher will be the pyrolytic yield in boron nitride of the polymer produced upon completion of the reaction. In a preferred embodiment of the invention, the molar ratio of compound (A)/compound (B) in the initial mixture is at least 1.

At the end of this reaction stage, the polymer is separated from the reaction medium, in particular the ammonium chlorhydrate formed, by any known means, for example by filtration or extraction and decantation by means, in particular, of an ammonia solution.

The polymer recovered in this manner, optionally after the elimination of the solvent and drying, constitutes the production.

In addition to the aforedescribed preparative process, the invention also features novel polymers based on boron and nitrogen produced thereby, and which, after pyrolysis thereof, result in the production of high yields by weight of boron nitride.

Thus, it has now also unexpectedly been determined that high weight yields of boron nitride can be produced from a polymer precursor based on boron and nitrogen, said precursor polymer comprising, per molecule:

(a) at least one structural unit of the Formula (I):

$$\begin{array}{c} | \\ X \\ | \\ B-X- \\ | \\ X \\ | \end{array} \quad (I)$$

and (b) at least one structural unit of the Formula (II):

$$\begin{array}{c} | \\ Y \\ | \\ B-X- \\ | \\ Y \\ | \end{array} \quad (II)$$

wherein X represents N-R$^1$ and Y represents N-R, in which R and R$^1$, which may be identical or different, are each a hydrogen atom, or a hydrocarbyl, organosilyl or hydrogenoorganosilyl radical.

It has now been discovered that such polymers based on boron and nitrogen, which have a network structure essentially comprising a combination of units of Formula (I) and units of Formula (II) such as defined above, have a significantly improved resistance to pyrolysis relative to the known precursors. Consequently, it is thus possible to produce ceramic materials based on boron nitride in good yields by weight.

It will be appreciated that the polymers comprising all of the desired (I) and (II) units, i.e., all of the desired R and R$^1$ radicals, can be prepared simply by reacting the compounds B and C defined above, which contain the same R and R$^1$ radicals.

More specifically, and without intending to limit the present invention to any particular theory, if the initial mixture contains BCl$_3$ (compound A) and a cyclic compound of the type:

$$\begin{array}{c} Cl \quad R \\ | \quad\;\; | \\ \boxed{(B-N)_n} \end{array}$$

(compound B), the co-aminolysis of this mixture by a compound of the type:

$$\begin{array}{c} H \\ \backslash \\ \;\;\;\; N-R^1 \\ / \\ H \end{array} \quad \text{(compound C)}$$

will produce, by conventional mechanism, a polymer essentially comprising a random combination of structural units of Formula (I):

$$\begin{array}{c} | \\ N-R^1 \\ | \\ -N-B-N- \\ | \quad\;\; | \\ R^1 \quad R^1 \end{array} \quad (I)$$

and structural units of Formula (III):

$$\begin{array}{c} | \\ N-R^1 \quad R \\ | \quad\quad\;\; | \\ \boxed{(B\!-\!-\!-\!-\!N)_n} \end{array} \quad (III)$$

the latter themselves being merely a formal repetition of D units of Formula (II), as defined above.

Similarly, the ratio between the units of Formula (I) and those of Formula (II) in the final polymer may be adjusted in a simple manner by utilizing an appropriate ratio between the compounds A and compounds B initially present in the reaction medium.

In a preferred embodiment of the invention, the polymer contains at least 50 molar % of units of Formula (I).

In general, it is observed that the higher the percentage of units (I), the higher the yield in boron nitride after pyrolysis.

As regards the hydrocarbyl and organosilyl radicals suitable for the polymers according to the invention, refer to the different examples given above of the radicals R and R$^1$ of compounds B and C.

Thus, alkyl, cycloalkyl, aryl, alkylaryl and arylalkyl radicals, and (triorgano)silyl radicals, such as, for example, the (trialkyl)silyl radicals, are especially suitable.

In another preferred embodiment of the invention, the R$^1$ radical is selected from among a hydrogen atom and the alkyl radicals.

Even more preferably, the R$^1$ radical is a hydrogen atom.

On the other hand, in order to obtain the best yields in ceramics in the pyrolysis, it is preferable to select the R radical from among the organosilyl radicals, and, more particularly, from among the (trialkyl)silyl radicals.

In a particularly preferred example of a polymer according to the invention, the units (I) and (II) are of the following type:

$$\begin{array}{c} | \\ NH \\ | \\ B-NH- \\ | \\ NH \\ | \end{array} \quad (I)$$

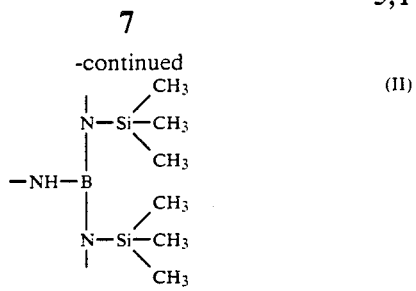

The polymers according to the invention have a number average molecular weight ranging from 300 to 50,000, preferably from 500 to 5,000.

They also have a weight average molecular weight of from 600 to 100,000, preferably from 1,000 to 10,000.

Depending on the molar ratio existing between the units of Formula (I) and those of Formula (II), the polymers according to the invention may be present, at ambient temperature, in a form varying from a rather viscous or highly viscous oil to the solid state. In general, a high proportion of units of Formula (I) corresponds to a high molecular weight polymer and thus to a high viscosity.

The polymers according to the invention are soluble in most of the usual organic solvents (hexane, toluene, and the like), which may be quite advantageous for the shaping thereof.

The polymers based on boron and nitrogen according to the invention are especially useful in the manufacture of ceramic materials and shaped articles at least in part comprising boron nitride.

In the most general case (the production of ceramic powders), the polymer is pyrolyzed in an inert atmosphere, under vacuum, or preferably in ammonia, at a temperature of from 100° to 2,000° C., until the polymer is entirely converted into boron nitride.

The polymer may be formed prior to pyrolysis, by molding or drawing, for example. If it is desired to produce fibers, the polymer is drawn by means of a conventional drawing die (possibly after melting, if the polymer is initially in the solid state), then heat treated at a temperature of from 100° to 2,000° C. and preferably under an ammonia atmosphere, to yield boron nitride fibers.

The resulting fibers may then be used, e.g., as reinforcing materials for composites of the ceramic/ceramic or ceramic/metal type.

In order to further illustrate the present invention and the advantages thereof, the following specific examples are given, it being understood that same are intended only as illustrative and in nowise limitative.

EXAMPLE I

Into a 250 ml flask, under nitrogen, at −5° C., were introduced 80 ml dry hexane, 3.4 g (0.029M) BCl$_3$ and 2.8 g (0.007M) of the compound prepared by the thermolysis, in xylene at reflux, according to the method described in the literature (R. L. Wells, *Inorg. Chemistry*, 29 (1963), and P. Geymayer, *Monatsh.*, 97, 429 (1966)), of

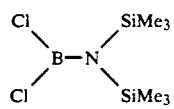

said resulting compound essentially having the formula:

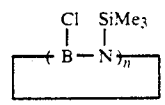

wherein n was essentially equal to 3.

Subsequently, ammonia was introduced into this mixture, over a time period of one hour at a flow rate of 7.5 liter/h. A white precipitate was then formed, which consisted essentially of ammonium chloride. After filtration and evaporation of the solvent, 2.35 g of a highly viscous oil were recovered, constituting the polymer according to the invention.

The isolated yield of the co-ammonolysis reaction was 70%.

The characteristics of the polymer were as follows:

$\overline{M}n$ = 1,000 (number average molecular weight);
$\overline{M}w$ = 2,000 (weight average molecular weight);
IP = 1.97 (polydispersity index);
TGA (under argon at 950° C.): 19.9%.

Pyrolysis of this polymer under nitrogen gave a white ceramic material consisting essentially of boron nitride.

The yield by weight of the pyrolysis at 1,100° C. was 25.4%; it was 21.4% at 1,500 ° C.

EXAMPLE 2

Into a three-necked flask and under nitrogen, were introduced 10.2 g (0.0870 mole) BCl$_3$, 8.05 g (0.0201 mole) of:

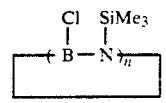

with n essentially being equal to 3 (prepared as in Example 1) and 250 ml dry hexane.

The mixture was cooled to −46° C., and gaseous ammonia (5.82 moles) was introduced; the reaction was then exothermic and the temperature of the mixture was maintained at −15°−18° C. during the introduction of the ammonia (reaction duration was 3 h).

After filtration under nitrogen, 21.3 g of a white solid consisting essentially of ammonium chloride and a hexane solution (which was then evaporated) were recovered. Subsequently, 5.4 g of a white solid constituting the polymer of the invention were collected.

The isolated yield of the co-ammonolysis reaction was 53%.

$\overline{M}n$ = 1,580;
$\overline{M}w$ = 4,680;
IP = 2.93;
Pr = 150° C. (softening point);
TGA (argon: −800° C.): 30.28%.

Pyrolysis of this polymer under nitrogen gave a white ceramic material which essentially consisted of boron nitride.

The yield of the pyrolysis at 1,100° C. was 30.1%.

These results clearly demonstrate the advantage of the process according to the invention in producing polymers based on boron and nitrogen having both high molecular weights and improved high temperature strength. Consequently, significantly improved yields in boron nitride were obtained, after pyrolysis.

Analysis evidenced that the resulting polymer essentially consisted of a combination of units of the formula:

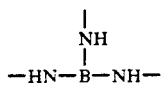

and units of the formula:

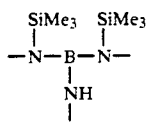

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a boron/nitrogen preceramic polymer, comprising reacting (a) admixture of a trihalogenoborane and a cyclic boron/nitrogen compound which comprises recurring structural units of the following general formula (1):

in which A is a halogen atom and R is a hydrogen atom, or a hydrocarbyl, organosilyl or hydrogenoorganosilyl radical, with (b) an amino compound which comprises at least one —NH$_2$ group.

2. The process as defined by claim 1, wherein said process is carried out in mass.

3. The process as defined by claim 1, carried out in an anhydrous organic solvent medium.

4. The process as defined by claim 1, wherein the molar ratio trihalogenoborane to the cyclic boron/nitrogen in said admixture (a) is at least one.

5. The process as defined by claim 1, wherein said trihalogenoborane comprises trichloroborane.

6. The process as defined by claim 1, wherein A in formula (1) is chloro.

7. The process as defined by claim 1, wherein said cyclic boron/nitrogen compound has the following general formula:

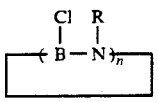

in which n is an integer ranging from 2 to 20.

8. The process as defined by claim 7, wherein n ranges from 3 to 10.

9. The process as defined by claim 1, wherein R is an alkyl, cycloalkyl, aryl, alkylaryl, arylalkyl, alkenyl or alkynyl radical.

10. The process as defined by claim 1, wherein R is an organosilyl radical.

11. The process as defined by claim 10, wherein R is a (triorgano)silyl radical.

12. The process as defined by claim 11, wherein R is a (trialkyl)silyl radical.

13. The process as defined by claim 1, wherein said amino compound has the following general formula (2):

in which R$^1$ is a hydrogen atom, or a hydrocarbyl, organosilyl or hydrogenoorganosilyl radical.

14. The process as defined by claim 13, wherein R$^1$ is a hydrogen atom or an alkyl radical.

15. The process as defined by claim 14, wherein R$^1$ is a hydrogen atom.

16. A cross-linked random boron/nitrogen polymer, comprising (a) at least one recurring structural unit of the Formula (I):

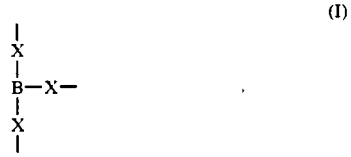

and (b) at least one recurring structural unit of the Formula (II):

in which Y is N—R and X is N—R$^1$, wherein R and R$^1$, which may be identical or different, are each a hydrogen atom, or a hydrocarbyl, organosilyl or hydrogenoorganosilyl radical, and wherein the recurring structural unit (I) and structural unit (II) are structurally different.

17. The boron/nitrogen polymer as defined by claim 16, wherein the molar ratio of the structural units (I) to the structural units (II) is at least one.

18. The boron/nitrogen polymer as defined by claim 16, wherein R is an alkyl, cycloalkyl, aryl, alkylaryl, arylalkyl, alkenyl or alkynyl radical.

19. The boron/nitrogen polymer as defined by claim 16, wherein R is an organosilyl radical.

20. The boron/nitrogen polymer as defined by claim 19, wherein R is a (triorgano)silyl radical.

21. The boron/nitrogen polymer is defined by claim 20, wherein R is a (trialkyl)silyl radical.

22. The boron/nitrogen polymer as defined by claim 16, wherein R$^1$ is a hydrogen atom or an alkyl radical.

23. The boron/nitrogen polymer as defined by claim 22, wherein R$^1$ is a hydrogen atom.

24. The boron/nitrogen polymer as defined by claim 16, having a number average molecular weight ranging from 300 to 50,000.

25. The boron/nitrogen polymer as defined by claim 24, having a number average molecular weight ranging from 500 to 5,000.

26. The boron/nitrogen polymer as defined by claim 16, having a weight average molecular weight ranging from 600 to 100,000.

27. The boron/nitrogen polymer as defined by claim 26, having a weight average molecular weight ranging from 1,000 to 10,000.

* * * * *